(12) United States Patent
Brinkman

(10) Patent No.: US 6,505,432 B2
(45) Date of Patent: Jan. 14, 2003

(54) FISH CATCHING SYSTEM

(75) Inventor: Stephen M. Brinkman, Beeville, TX (US)

(73) Assignee: S&C Brinkman Corporation, Beeville, TX (US)

( * ) Notice: Subject to any disclaimer, the term of this patent is extended or adjusted under 35 U.S.C. 154(b) by 0 days.

(21) Appl. No.: 09/819,584

(22) Filed: Mar. 28, 2001

(65) Prior Publication Data

US 2002/0073605 A1 Jun. 20, 2002

Related U.S. Application Data

(63) Continuation-in-part of application No. 09/745,235, filed on Dec. 20, 2000.

(51) Int. Cl.[7] .............................................. A01K 85/18
(52) U.S. Cl. ...................... 43/42.02; 43/42; 43/42.37; 43/44.8
(58) Field of Search ....................... 43/42.37, 42.26, 43/42.02, 44.8, 42

(56) References Cited

U.S. PATENT DOCUMENTS

| | | | | |
|---|---|---|---|---|
| 2,290,433 A | * | 7/1942 | Jeffers | 43/42 |
| 2,663,964 A | * | 12/1953 | Martin | 43/42.02 |
| 2,770,063 A | * | 11/1956 | Martin | 43/42.02 |
| 2,791,859 A | * | 5/1957 | Wentworth | 43/42.02 |
| 3,729,851 A | * | 5/1973 | Garcia | 43/44.8 |
| 4,208,822 A | * | 6/1980 | Bryant | 43/42.02 |
| 4,516,352 A | * | 5/1985 | Firmin | 43/42.26 |
| 4,771,567 A | * | 9/1988 | Cannon | 43/42.26 |
| 5,228,230 A | * | 7/1993 | Vaught | 43/42.26 |
| 5,261,183 A | * | 11/1993 | Dworski | 43/42.37 |

OTHER PUBLICATIONS

Orgeron et al., Dec. 6, 2001, U.S. PAtent Office. Pub. No. US 2001/0047609 A1.*

* cited by examiner

Primary Examiner—Charles T. Jordan
Assistant Examiner—Bret Hayes
(74) Attorney, Agent, or Firm—Christopher L. Makay

(57) ABSTRACT

A fish catching system includes a hook having a barb and a shaft terminating in an eyelet that receives a fishing line. The fish catching system further includes a lure manipulator having a lure retainer, a lure retaining post, and a passageway therethrough that receives the shaft of the hook therein. The fish catching system still further includes a decapod-shaped lure having a body and a tail.

27 Claims, 2 Drawing Sheets

FISH CATCHING SYSTEM

CROSS-REFERENCE TO RELATED APPLICATION

This application is a continuation-in-part of application Ser. No. 09/745,235, which was filed Dec. 20, 2000.

BACKGROUND OF THE INVENTION

1. Field of the Invention

The present invention relates to fishing and, more particularly, but not by way of limitation, to a fish catching system including a fishing lure shaped as a decapod.

2. Description of the Related Art

Many game fish sought by anglers are predators pursuing live food animals. Game fish typically maintain a set diet consisting of one or several main live food animals. Illustratively, certain game fish feed primarily on decapods, such as a shrimp, crawfish, lobster, and the like. Game fish in pursuing decapods instinctively and through experience understand the characteristics of such live food animals. Consequently, during hunting, game fish search for decapod signs according to their known characteristics and, upon finding a decapod, attack and devour the decapod.

Anglers often use live bait because game fish prefer their decapod food animals alive. Although live bait can be successful, there is the disadvantage in that the bait dies quickly rendering it ineffective in attracting game fish. A dead decapod attached to a fishing line does not exhibit the characteristics normally associated with such animals, resulting in game fish ignoring the bait and a poor day of fishing.

In an attempt to replace live bait, artificial fishing lures in the form of decapods have been developed. Unfortunately, such lures have experienced limited success because they do not present game fish with a realistic looking and acting food animal. The lures are typically not properly colored like a live decapod and, further, do not exhibit the characteristics normally associated with such animals. When the lure is pulled through the water, it appears no different than a dead decapod, thereby failing to attract game fish.

Accordingly, a fish catching system including a lure shaped and colored as a decapod that may be manipulated to exhibit the characteristics normally associated with live decapods improves over both live bait and existing artificial lures.

SUMMARY OF THE INVENTION

In accordance with the present invention, a fish catching system includes a hook, a lure manipulator, and a decapod-shaped lure. The hook includes a barb and a shaft terminating in an eyelet that receives a fishing line. The lure manipulator includes a lure retainer, a head coupled with the lure retainer, a lure retaining post coupled with the head, and a passageway therethrough that receives the shaft of the hook therein The decapod-shaped lure includes a body and a tail. The body includes claws, antennae, eyes, and the tail includes a tail fan.

In use, the tail of the decapod-shaped lure attaches to the lure retainer and the lure-retaining post of the lure manipulator, and the body of the decapod-shaped lure attaches to the hook, thereby placing the decapod-shaped lure in a first position. Pulling the fishing line moves the shaft of the hook through the passageway to pivot the tail underneath the body, thereby placing the lure in a second position. Releasing the fishing line returns the shaft of the hook through the passageway, thereby placing the lure in the first position.

A method of attracting game fish includes providing the foregoing fish catching system. The hook is attached to the fishing line via the eyelet, the tail of the decapod-shaped lure is attached to the lure retainer of the lure manipulator, and the body of the decapod-shaped lure is attached to the hook. The decapod-shaped lure is cast into a body of water and allowed to sink below the water. The fishing line is pulled to move the shaft of the hook through the passageway and pivot the tail underneath the body and then released to return the shaft of the hook through the passageway and the tail from underneath the body. The fishing line is alternately pulled and released to attract game fish.

It is therefore an object of the present invention to provide a fish catching system that permits movement of a lure independent of reeling a fishing line.

It is another object of the present invention to provide a fish catching system that simulates live game fish prey.

It is a further object of the present invention to provide a fish catching system suitable for moving a lure stationary in a body of water.

It is still another object of the present invention to provide a decapod-shaped lure.

It is still a further object of the present invention to provide a lure that may be worked so as to appear the same as a live decapod traveling through the water.

It is even a further object of the present invention to provide a lure that attracts game fish because it presents game fish with prey that both looks and acts identical to their staple food of decapods.

Still other objects, features, and advantages of the present invention will become evident to one of ordinary skill in the art in light of the following.

DETAILED DESCRIPTION OF THE PREFERRED EMBODIMENT

Figure 1:
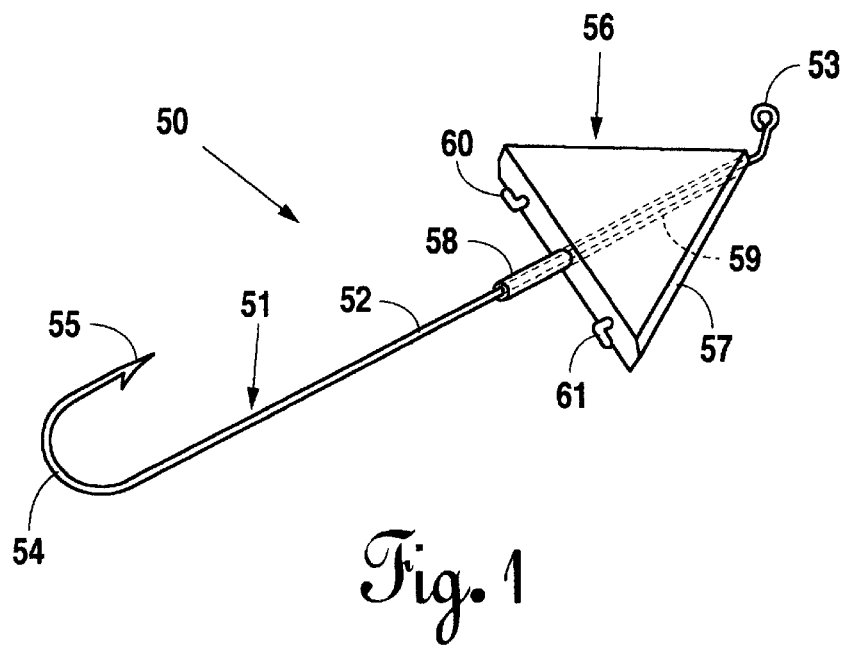
FIG. 1 is a perspective view illustrating a lure manipulator of a fish catching system.
Figure 2:
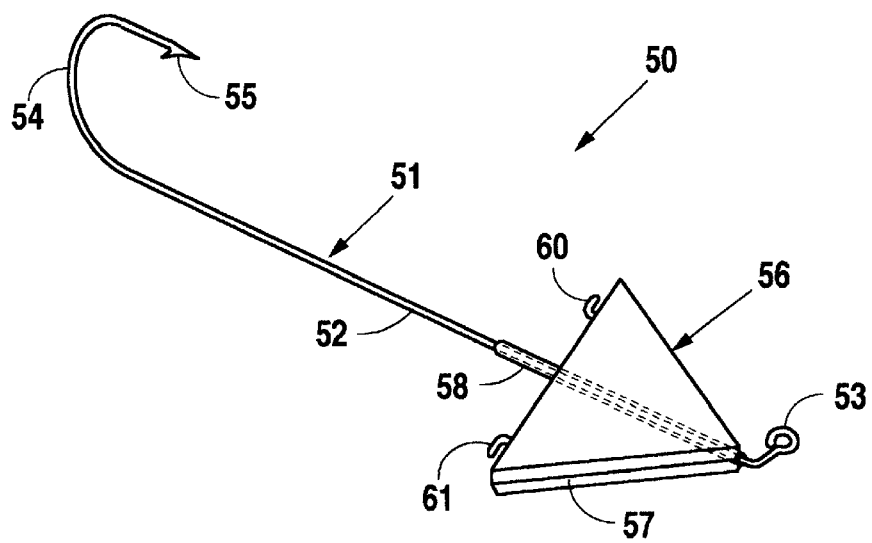
FIG. 2 is a perspective view illustrating the lure manipulator of the fish catching system.

As illustrated in FIGS. 1 and 2, a fish catching system 50 includes a hook 51 having a shaft 52 terminating in an eyelet 53 at a first end and a curvature 54 terminating in a barb 55 at a second end. Although this preferred embodiment discloses a hook 51 including a single barb 55, those of ordinary skill in the art will recognize that any hook, such as a treble hook, may be substituted.

The fish catching system 50 further includes a lure manipulator 56. The lure manipulator 56 includes a lure retainer 58, a head 57 secured to or formed integrally with the lure retainer 58, and a passageway 59 through the head 57 and the lure retainer 58. The lure manipulator 56 further includes lure-retaining posts 60 and 61 secured to or formed integrally with the head 57. The passageway 59 permits the lure manipulator 56 to reside about the shaft 52 of the hook 51. The lure manipulator 56 secures about the shaft 52 during the manufacturing process of the fish catching system 50 using any of several standard and well-known techniques. The passageway 59 however is sized such that the lure manipulator 56 freely slides along the shaft 52 of the hook 51. The lure retainer 58 may include any device, such as concentric flanges, a barb, or other detent, that receives a lure thereon but prevents dislodgement of the lure during the use of the lure manipulator 56. The lure manipulator 56 may be constructed from any suitable material, such as lead, metal, hard plastic, hollow plastic, or the like.

In this preferred embodiment, the head 57 is triangle-shaped and is weighted to permit sinking of the fish catching system 50, however, those of ordinary skill in the art will recognize that the head 57 could include any suitable shape. Furthermore, those of ordinary skill in the art will recognize that the lure manipulator 56 could include only the lure retainer 58 suitably weighted, and the lure-retaining posts 60 and 61 could be secured to the lure retainer. Although the preferred embodiment discloses that the lure manipulator 56 freely slides along the shaft 52 of the hook 51, those of ordinary skill in the art will appreciate that under certain fishing conditions it would be desirable to have the lure manipulator 56 fixed permanently to the shaft 52.

Figure 3:
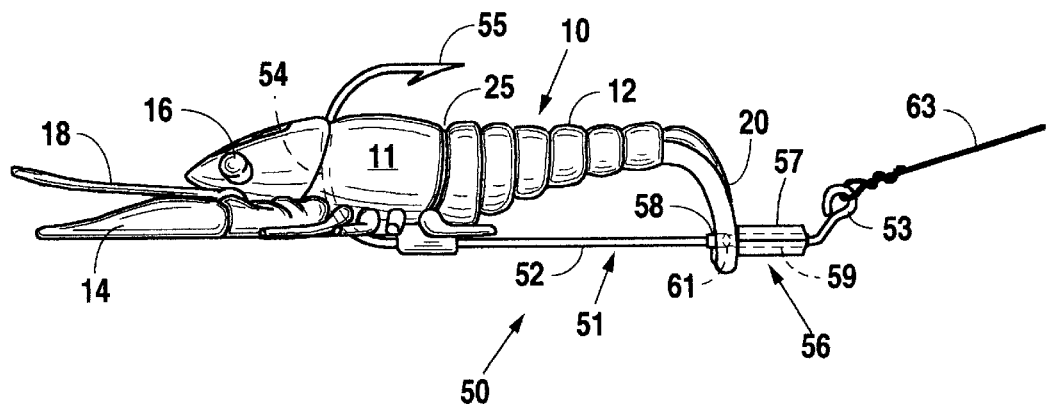
FIG. 3 is a side elevation view illustrating a lure of the fish catching system in a first position with the lure manipulator attached thereto.
Figure 4:
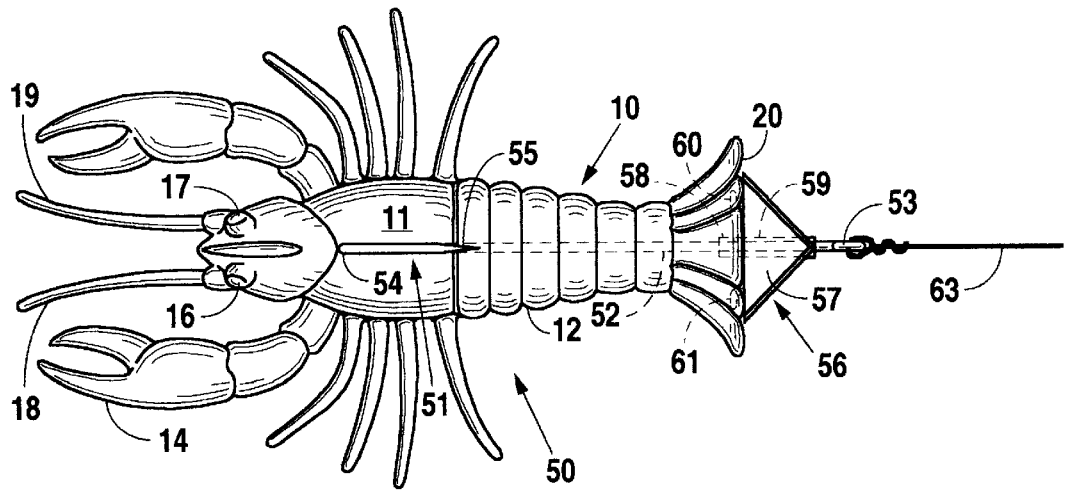
FIG. 4 is a top plan view illustrating the lure of the fish catching system in the first position with the lure manipulator attached thereto.
Figure 5:
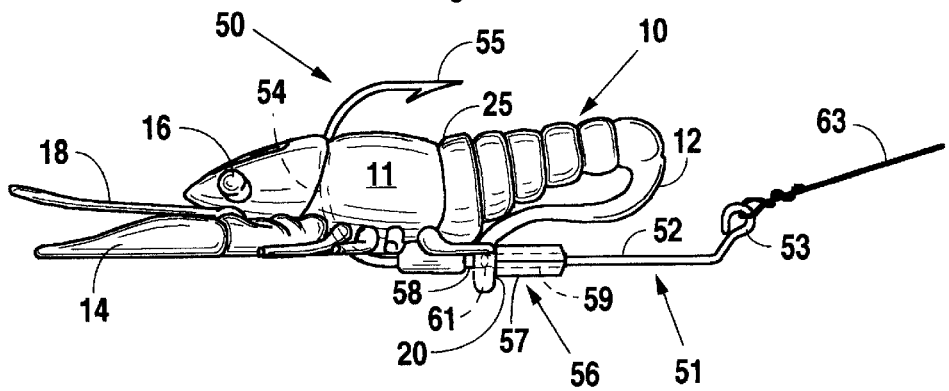
FIG. 5 is a side elevation view illustrating the lure of the fish catching system in a second position with the lure manipulator attached thereto.

As illustrated in FIGS. 3–5, the fish catching system 50 still further includes a lure 10 that provides both the proper shape and coloring exhibited by a decapod, such as a shrimp, crawfish, lobster, and the like. The lure 10 in this preferred embodiment is constructed from soft plastic or any suitably malleable material.

The lure 10 includes a body 11 and a tail 12. The body 11 includes claws 14 and 15 and antennae 18 and 19, which are both formed integrally at a front portion thereof. The body further includes eyes 16 and 17 attached at a front portion of thereof. The tail 12 includes a tail fan 20 formed integrally at the rear thereof. The body 11 and the tail 12, including the claws 14 and 15, antennae 18 and 19, and the eyes 16 and 17, provide the lure 10 with a shape identical to a decapod. Further, the color of the body 11 and the tail 12, including the claws 14 and 15, antennae 18 and 19, and the eyes 16 and 17, resemble that of a decapod or any other color scheme suitable to attract game fish.

In use, an angler attaches a fishing line 63 supported on a rod and reel to the eyelet 53 of the hook 51. The angler then drives the lure retainer 58 of the lure manipulator 56 through the tail fan 20 of the lure 10. The angler further inserts the lure-retaining posts 60 and 61 of the lure manipulator 56 through the tail fan 20 of the lure 10. Next, the angler inserts the hook 51 through the body 11 of the lure 10 starting underneath the body 11 and going through the body 11 until the barb 55 protrudes from the top of the body 11, thereby placing the fish catching system 50 in a first or unmanipulated position as illustrated in FIGS. 4 and 5.

When rigged as described above, the angler casts the fish catching system 50 into a body of water and permits the fish catching system 50 to sink to a desired depth, where it resides in the first or unmanipulated position as illustrated in FIGS. 4 and 5. Once at the desired depth, the fish catching system 50 permits the angler to move the lure 10 without having to retrieve the fishing line 63 utilizing the reel. The angler grasps the fishing line 63 and pulls it a limited distance, resulting in the shaft 52 of the hook 51 passing forward through the passageway 59 of the lure manipulator 56. Alternatively, the angler may move the rod to facilitate the passing forward of the shaft 52 through the passageway 59. The shaft 52 passes forward through the passageway 59 until the body 11 of the lure 10 contacts the lure retainer 58 of the lure manipulator 56, thereby creating a space 62, compressing the tail 12 of the lure 10 underneath the body 11, and moving the fish catching system 50 into a second or manipulated position as illustrated in FIG. 5.

Upon reaching the second or manipulated position, the angler looses the tension in the fishing line 63, allowing the release of elastic energy stored in the tail 12 of the lure 10 due to its compression and facilitating the return of the shaft 52 rearward through the passageway 59. The shaft 52 passes rearward through the passageway 59 until the eyelet 53 of the hook 51 abuts the head 57 of the lure manipulator 56, thereby eliminating the space 62, uncompressing the tail 12 of the lure 10, and moving the fish catching system 50 into its first or unmanipulated position.

In moving back and forth between the first or unmanipulated position and the second or manipulated position, the tail 12 of the lure 10 compresses and releases to simulate a swimming decapod in the body of water. In systematically moving the tail 12 of the lure 10, the angler attempts to attract a game fish's attention resulting in a strike upon the lure 10 and the subsequent hooking of the game fish via the hook 51. After moving the tail 12 of the lure 10 in place, the angler still has the option of reeling the fish catching system 50 to a new location before again moving the tail 12 of the lure 10. The angler repeats the foregoing procedure until a game fish strikes or the fish catching system 50 has been retrieved completely.

The fish catching system 50 is an improvement in attracting game fish because, when attached by a fishing line to a fishing rod and reel, an angler may work the lure 10 to appear the same as a live decapod traveling through the water. In working the fish catching system 50 as described above, the angler manipulates the lure 10 such that it appears as a decapod traveling through the water because live decapods travel backwards using their tails as the means of propulsion. Accordingly, the fish catching system 50 attracts game fish because it presents game fish with prey that both looks and acts identical to their staple food of decapods.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited in any respect by the foregoing description; rather, it is defined only by the claims that follow.

I claim:

1. A fish catching system, comprising:
    a decapod-shaped lure comprising a body and a tail;
    a hook including a barb and a shaft terminating in an eyelet that receives a fishing line; and
    a lure manipulator including a lure retainer, a lure retaining post, and a passageway therethrough that receives the shaft of the hook therein, wherein the tail of the decapod-shaped lure attaches to the lure retainer and the lure-retaining post of the lure manipulator and the body of the decapod-shaped lure attaches to the hook thereby placing the decapod-shaped lure in a first position, whereby pulling the fishing line moves the shaft of the hook through the passageway to pivot the tail underneath the body, thereby placing the lure in a second position, and releasing the fishing line returns the shaft of the hook through the passageway, thereby placing the lure in the first position.

2. The fish catching system according to claim 1, wherein movement of the lure between the first position and the second position simulates movement of game fish prey.

3. The fish catching system according to claim 1, wherein the shaft of the hook permanently attaches to the lure manipulator.

4. The fish catching system according to claim 1, wherein the lure manipulator further comprises a head coupled with the lure retainer.

5. The fish catching system according to claim 1, wherein releasing the fishing line re the decapod-shaped lure to the first position due to the elasticity of the tail.

6. The lure according to claim 1 wherein the tail includes a tail fan.

7. The lure according to claim 1 wherein the body includes claws.

8. The lure according to claim 1 wherein the body includes antennae.

9. The lure according to claim 1 wherein the body includes eyes.

10. A fish catching system, comprising:

a decapod-shaped lure comprising a body and a tail;

a hook including a barb and a shaft terminating in an eyelet that receives a fishing line; and a lure manipulator including a lure retainer, a head coupled with the lure retainer, a lure retaining post coupled with the head, and a passageway therethrough that receives the shaft of the hook therein, wherein the tail of the decapod-shaped lure attaches to the lure retainer and the lure retaining post of the lure manipulator and the body of the decapod-shaped lure attaches to the hook thereby placing the decapod-shaped lure in a first position, whereby pulling the fishing line moves the shaft of the hook through the passageway to pivot the tail underneath the body, thereby placing the lure in a second position, and releasing the fishing line returns the shaft of the hook through the passageway, thereby placing the lure in the first position.

11. The fish catching system according to claim 10, wherein the shaft of the hook permanently attaches to the lure manipulator.

12. The fish catching system according to claim 10, wherein releasing the fishing line returns the decapod-shaped lure to the first position due to the elasticity of the tail.

13. The lure according to claim 10 wherein the tail includes a tail fan.

14. The lure according to claim 10 wherein the body includes claws.

15. The lure according to claim 10 wherein the body includes antennae.

16. The lure according to claim 10 wherein the body includes eyes.

17. A method of attracting game fish, comprising:

providing a fish catching system, comprising:

a hook including a barb and a shaft terminating in an eyelet that receives a fishing line, a lure manipulator including a passageway therethrough that receives the shaft of the hook therein, and a decapod-shaped lure comprising a body and a tail;

attaching the hook to a fishing line via the eyelet;

attaching the tail of the decapod-shaped lure to the lure manipulator and the body of the decapod-shaped lure to the hook;

casting the decapod-shaped lure into a body of water;

allowing the decapod-shaped lure to sink below the water;

pulling the fishing line to move the shaft of the hook through the passageway and pivot the tail underneath the body;

releasing the fishing line to return the shaft of the hook through the passageway and the tail from underneath the body; and alternately pulling and releasing the fishing line.

18. A fish catching system, comprising:

a decapod-shaped lure comprising a body and a tail;

a hook including a barb and a shaft terminating in an eyelet that receives a fishing line; and a lure manipulator including a passageway therethrough that receives the shaft of the hook therein, wherein the tail of the decapod-shaped lure attaches to the lure manipulator and the body of the decapod-shaped lure attaches to the hook thereby placing the decapod-shaped lure in a first position, whereby pulling the fishing line moves the shaft of the hook through the passageway to pivot the tail underneath the body, thereby placing the lure in a second position, and releasing the fishing line returns the shaft of the hook through the passageway, thereby placing the lure in the first position.

19. The fish catching system according to claim 18, wherein the shaft of the hook permanently attaches to the lure manipulator.

20. The fish catching system according to claim 18, wherein releasing the fishing line returns the decapod-shaped lure to the first position due to the elasticity of the tail.

21. The lure according to claim 18 wherein the tail includes a tail fan.

22. The lure according to claim 18 wherein the body includes claws.

23. The lure according to claim 18 wherein the body includes antennae.

24. The lure according to claim 18 wherein the body includes eyes.

25. The fish catching system according to claim 18, wherein movement of the lure between the first position and the second position simulates movement of game fish prey.

26. The fish catching system according to claim 18, wherein the shaft of the hook permanently attaches to the lure manipulator.

27. The fish catching system according to claim 18, wherein the lure manipulator comprises a head coupled with a lure retainer.

* * * * *